US009979231B2

(12) United States Patent
Fukaya

(10) Patent No.: US 9,979,231 B2
(45) Date of Patent: May 22, 2018

(54) ELECTRONIC APPARATUS, METHOD FOR CONTROLLING THE SAME, AND STORAGE MEDIUM

(71) Applicant: CANON KABUSHIKI KAISHA, Tokyo (JP)

(72) Inventor: Yudai Fukaya, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 358 days.

(21) Appl. No.: 14/617,578

(22) Filed: Feb. 9, 2015

(65) Prior Publication Data
US 2015/0229136 A1  Aug. 13, 2015

(30) Foreign Application Priority Data

Feb. 10, 2014 (JP) ................. 2014-023828

(51) Int. Cl.
H02J 5/00     (2016.01)
H02J 7/02     (2016.01)
H02J 17/00    (2006.01)
H02J 50/12    (2016.01)
H02J 50/80    (2016.01)
H02J 7/00     (2006.01)

(52) U.S. Cl.
CPC ............. H02J 50/12 (2016.02); H02J 5/005 (2013.01); H02J 7/025 (2013.01); H02J 50/80 (2016.02); H02J 7/0044 (2013.01)

(58) Field of Classification Search
CPC .......... H02J 5/005; H02J 7/0044; H02J 7/025; H02J 17/00; H02J 50/10; H02J 50/12; H02J 50/80; H04B 5/0031; H04B 5/0037; H04B 5/0075; H04B 5/0081

USPC ........................................ 307/104
See application file for complete search history.

(56) References Cited

U.S. PATENT DOCUMENTS

| 6,313,612 B1* | 11/2001 | Honda ............. G04C 10/00 320/139 |
| 2009/0278505 A1* | 11/2009 | Toya ............. H02J 7/025 320/152 |
| 2013/0033235 A1* | 2/2013 | Fukaya ............. H02J 17/00 320/162 |
| 2013/0307346 A1* | 11/2013 | Arisawa ............. H02J 7/025 307/104 |
| 2014/0145675 A1* | 5/2014 | Shimizu ............. H02J 7/025 320/108 |
| 2015/0035480 A1* | 2/2015 | Shichino ............. H02J 7/0004 320/107 |

(Continued)

FOREIGN PATENT DOCUMENTS

| JP | 10-285836 A | 10/1998 |
| JP | 2010148210 A | 7/2010 |
| JP | 2013150534 A | 8/2013 |

Primary Examiner — Levi Gannon
(74) Attorney, Agent, or Firm — Canon U.S.A., Inc. IP Division

(57) ABSTRACT

A power reception apparatus includes a power reception unit configured to wirelessly receive power from a power supply apparatus, a first detection unit configured to detect a voltage of the power received by the power reception unit, a second detection unit configured to detect a voltage output from a battery, a load unit, and a control unit configured to control supply of the power received by the power reception unit to the load unit according to a detection result of the first detection unit and a detection result of the second detection unit.

11 Claims, 6 Drawing Sheets

(56) References Cited

U.S. PATENT DOCUMENTS

| | | | | |
|---|---|---|---|---|
| 2015/0303703 A1* | 10/2015 | Hayashi | ............... | H02J 5/005 |
| | | | | 307/104 |
| 2016/0075240 A1* | 3/2016 | Inoue | ................ | H02J 50/10 |
| | | | | 320/108 |
| 2016/0141886 A1* | 5/2016 | Eguchi | ................ | H02J 5/005 |
| | | | | 307/104 |
| 2016/0152149 A1* | 6/2016 | Misawa | ............. | B60L 11/182 |
| | | | | 320/108 |

\* cited by examiner

FIG. 6

| VOLTAGE V1 | VOLTAGE V2 | MODE |
|---|---|---|
| FIRST PREDETERMINED VALUE ≥ V1 ≥ SECOND PREDETERMINED VALUE | V2 ≥ FIFTH PREDETERMINED VALUE | THIRD MODE |
| FIRST PREDETERMINED VALUE ≥ V1 ≥ SECOND PREDETERMINED VALUE | FIFTH PREDETERMINED VALUE > V2 | SECOND MODE |
| SECOND PREDETERMINED VALUE > V1 | V2 ≥ FIFTH PREDETERMINED VALUE | THIRD MODE |
| SECOND PREDETERMINED VALUE > V1 | FIFTH PREDETERMINED VALUE > V2 ≥ THIRD PREDETERMINED VALUE | SECOND MODE |
| FIRST PREDETERMINED VALUE > V1 | THIRD PREDETERMINED VALUE > V2 | FIRST MODE |

ELECTRONIC APPARATUS, METHOD FOR CONTROLLING THE SAME, AND STORAGE MEDIUM

BACKGROUND OF THE INVENTION

Field of the Invention

The present invention relates to an electronic apparatus that wirelessly receives power from an external apparatus.

Description of the Related Art

Recently, a wireless power supply system including a power supply apparatus that wirelessly outputs power without connector connection and an electronic apparatus that supplies the power wirelessly supplied from the power supply apparatus to a load has been known.

Japanese Patent Application Laid-Open No. 10-285836 discusses the number of turns of a power reception coil and the capacitance of a resonance capacitor of the electronic apparatus are set according to the impedance of the load of the electronic apparatus in such a wireless power supply system.

However, in such a wireless power supply system, the power supplied from the power supply apparatus to the electronic apparatus may vary suddenly, depending on the distance and positional relationship between the power supply apparatus and the electronic apparatus. If the power supplied from the power supply apparatus to the electronic apparatus decreases in a case where the electronic apparatus is being charged or the load is operating, the electronic apparatus may fail to be normally controlled and the operation of the electronic apparatus may become unstable.

SUMMARY OF THE INVENTION

An aspect of the present invention is directed to an electronic apparatus capable of operating stably even if power supplied from a power supply apparatus to the electronic apparatus decreases.

According to an aspect of the present invention, at least one of the above-described drawbacks and disadvantages can be overcome.

According to another aspect of the present invention, there is provided a power reception apparatus including a power reception unit configured to wirelessly receive power from a power supply apparatus, a first detection unit configured to detect a voltage of the power received by the power reception unit, a second detection unit configured to detect a voltage output from a battery, a load unit, and a control unit configured to control supply of the power received by the power reception unit to the load unit according to a detection result of the first detection unit and a detection result of the second detection unit.

According to yet another aspect of the present invention, there is provided a method for controlling an electronic apparatus, including wirelessly receiving power from a power supply apparatus, detecting a voltage of the power received from the power supply apparatus, detecting a voltage output from a battery, and controlling supply of the power received from the power supply apparatus to a load unit according to a detection result of the value of the voltage of the power received from the power supply apparatus and a detection result of the value of the voltage output from the battery.

According to yet another aspect of the present invention, there is provided a storage medium storing a computer-executable program, the program causing a computer to perform a method for controlling an electronic apparatus, including wirelessly receiving power from a power supply apparatus, detecting a voltage of the power received from the power supply apparatus, detecting a voltage output from a battery, and controlling supply of the power received from the power supply apparatus to a load unit according to a detection result of the value of the voltage of the power received from the power supply apparatus and a detection result of the value of the voltage output from the battery.

Further features of the present invention will become apparent from the following description of exemplary embodiments with reference to the attached drawings.

BRIEF DESCRIPTION OF THE DRAWINGS

FIG. 6 is a diagram illustrating an example of a predetermined table according to the first exemplary embodiment.

DESCRIPTION OF THE EMBODIMENTS

Various exemplary embodiments, features, and aspects of the invention will be described in detail below with reference to the drawings.

A first exemplary embodiment of the present invention will be described below with reference to the drawings.

Figure 1:
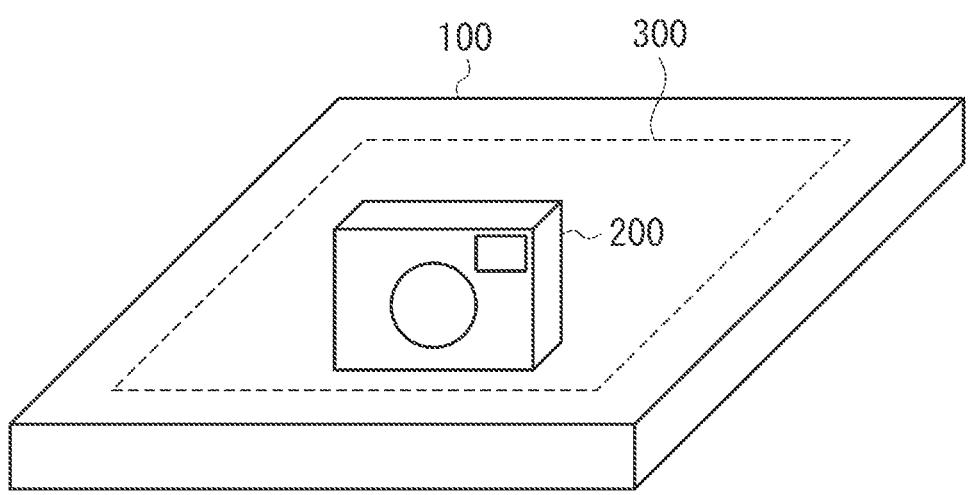
FIG. 1 is a diagram illustrating an example of a power supply system according to a first exemplary embodiment.

As illustrated in FIG. 1, a power supply system according to the present exemplary embodiment includes a power supply apparatus 100 and an electronic apparatus 200. In the power supply system according to the present exemplary embodiment, if the electronic apparatus 200 is located within a predetermined area 300 of the power supply apparatus 100, the power supply apparatus 100 wirelessly supplies power to the electronic apparatus 200. Further, if the electronic apparatus 200 is located within the predetermined area 300, the electronic apparatus 200 can wirelessly receive power output from the power supply apparatus 100. If the electronic apparatus 200 is not located within the predetermined area 300, the electronic apparatus 200 is not able to receive power from the power supply apparatus 100. The predetermined area 300 is an area in which the power supply apparatus 100 can communicate with the electronic apparatus 200. The predetermined area 300 is configured as, but not limited to, an area on a housing of the power supply apparatus 100. The power supply apparatus 100 may wirelessly supply power to a plurality of electronic apparatuses.

The electronic apparatus 200 may be an imaging apparatus, a reproduction apparatus, or a communication apparatus such as a mobile phone and a smartphone. The electronic apparatus 200 may be a battery pack including a battery or batteries. Further, the electronic apparatus 200 may be an automobile, a display, or a personal computer.

Figure 2:
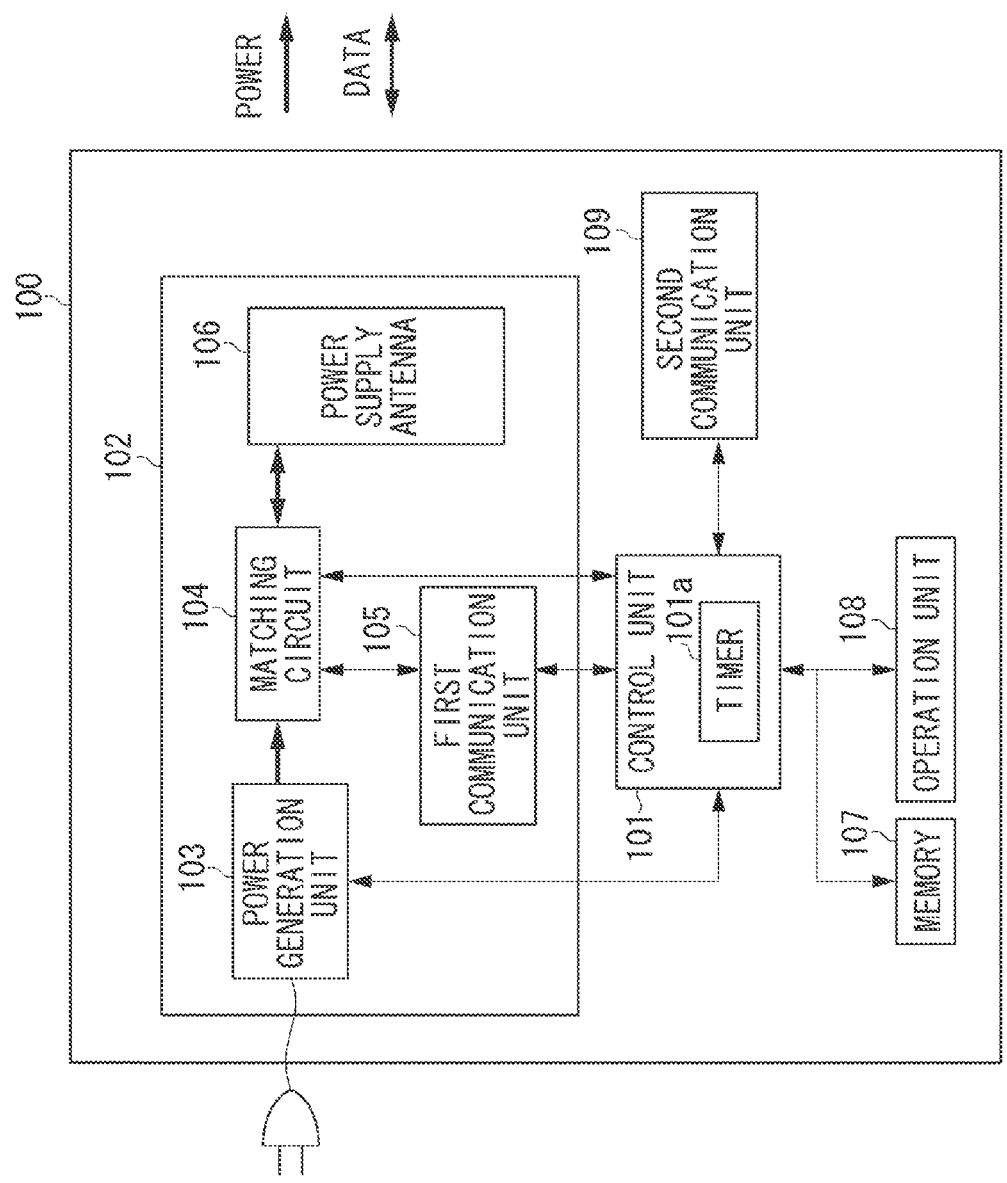
FIG. 2 is a block diagram illustrating an example of a power supply apparatus according to the first exemplary embodiment.

Next, an example of a configuration of the power supply apparatus 100 according to the present exemplary embodiment will be described with reference to FIG. 2. As illustrated in FIG. 2, the power supply apparatus 100 includes a control unit 101, a power supply unit 102, a memory 107, an operation unit 108, and a second communication unit 109. The power supply unit 102 includes a power generation unit 103, a matching circuit 104, a first communication unit 105, and a power supply antenna 106.

The control unit 101 controls the power supply apparatus 100 by executing a computer program stored in the memory 107. For example, the control unit 101 includes a central processing unit (CPU) and/or a micro processing unit (MPU). The control unit 101 is configured by hardware. The control unit 101 includes a timer 101a.

The power supply unit 102 is used to perform wireless power supply based on a power supply method. An example of the power supply method is a magnetic resonance method. The magnetic resonance method includes transmitting power from the power supply apparatus 100 to the electronic apparatus 200 in a state where the power supply apparatus 100 and the electronic apparatus 200 are resonating with each other. The state where the power supply apparatus 100 and the electronic apparatus 200 are resonating with each other refers to a state in which the power supply antenna 106 of the power supply apparatus 100 and a power reception antenna 203 of the electronic apparatus 200 have the same resonance frequency.

If an alternating-current (AC) power source (not illustrated) is connected with the power supply apparatus 100, the power generation unit 103 generates power to be output to outside via the power supply antenna 106 using power supplied from the AC power source.

The power generation unit 103 generates first power and second power. The first power is used for the first communication unit 105 to communicate with the electronic apparatus 200. For example, the first power is weak power of 1 W or less. The first power may be power defined by a communication standard of the first communication unit 105. The second power is used for the electronic apparatus 200 to charge up or perform specific operations. For example, the second power is power of 2 W or more. The second power is not limited to the power of 2 W or more as long as the power is greater than the first power.

The power generated by the power generation unit 103 is supplied to the power supply antenna 106 via the matching circuit 104.

The matching circuit 104 includes a circuit for setting the resonance frequency of the power supply antenna 106, and a circuit for matching impedance between the power generation unit 103 and the power supply antenna 106.

When the power supply apparatus 100 outputs either the first power or the second power via the power supply antenna 106, the control unit 101 controls the matching circuit 104 to set the resonance frequency of the power supply antenna 106 at a predetermined frequency f. For example, the predetermined frequency f is 13.56 MHz.

The first communication unit 105 performs wireless communication based on the Near Field Communication (NFC) standard defined by the NFC Forum. The communication standard of the first communication unit 105 may be the International Organization for Standardization/International Electrotechnical Commission (ISO/IEC) 18092 standard, ISO/IEC 14443 standard, or ISO/IEC 21481 standard. When the power supply antenna 106 is outputting the first power, the first communication unit 105 can perform data transmission and reception for performing wireless power supply with the electronic apparatus 200 via the power supply antenna 106. However, in a period when the power supply antenna 106 is outputting the second power, the first communication unit 105 does not communicate with the electronic apparatus 200 via the power supply antenna 106.

When transmitting data to the electronic apparatus 200, the first communication unit 105 performs process for superposing the data to be transmitted to the electronic apparatus 200 on the first power supplied from the power generation unit 103. The first power on which the data has been superposed is transmitted to the electronic apparatus 200 via the power supply antenna 106.

When receiving data from the electronic apparatus 200, the first communication unit 105 detects a current flowing through the power supply antenna 106, and receives the data from the electronic apparatus 200 according to the detection result of the current. This is because the electronic apparatus 200 transmits data to the power supply apparatus 100 by varying a load inside the electronic apparatus 200 when the electronic apparatus 200 transmits the data to the power supply apparatus 100. If the load inside the electronic apparatus 200 varies, the current flowing through the power supply antenna 106 varies. Thus, the first communication unit 105 can receive the data from the electronic apparatus 200 by detecting the current flowing through the power supply antenna 106.

The power supply antenna 106 is an antenna for outputting either the first power or the second power to the electronic apparatus 200. When performing wireless power supply to the electronic apparatus 200, the control unit 101 controls the power supply unit 102 so that the first power and the second power are alternately output via the power supply antenna 106.

The memory 107 stores the computer program for controlling the power supply apparatus 100. The memory 107 also stores data that has been obtained by at least one of the first communication unit 105 and the second communication unit 113 from the electronic apparatus 200.

The operation unit 108 provides a user interface for operating the power supply apparatus 100. The control unit 101 controls the power supply apparatus 100 according to an input signal input via the operation unit 108.

The second communication unit 109 performs wireless communication with the electronic apparatus 200 based on a communication standard different from that of the first communication unit 105. Examples of the communication standard of the second communication unit 109 include a wireless local area network (LAN) standard and the Bluetooth (registered trademark) standards. The second communication unit 109 can transmit and receive data including at least one of video data, audio data, and a command between the power supply apparatus 100 and the electronic apparatus 200.

Figure 3:
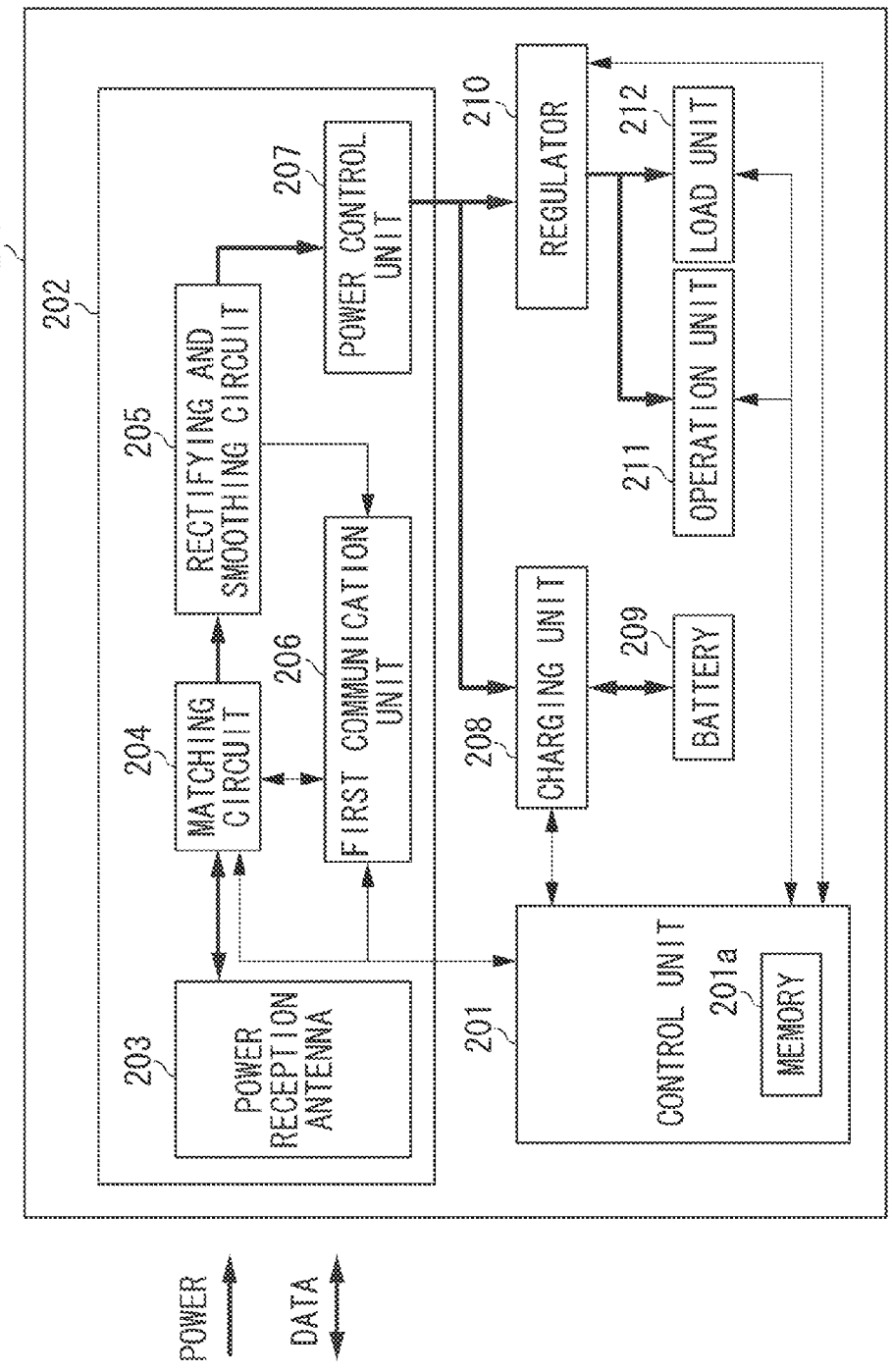
FIG. 3 is a block diagram illustrating an example of an electronic apparatus according to the first exemplary embodiment.

Next, an example of a configuration of the electronic apparatus 200 will be described with reference to FIG. 3. The electronic apparatus 200 includes a control unit 201, a power reception unit 202, a charging unit 208, a battery 209, a regulator 210, an operation unit 211, and a load unit 212. The power reception unit 202 includes the power reception antenna 203, a matching circuit 204, a rectifying and smoothing circuit 205, a first communication unit 206, and a power control unit 207.

The control unit 201 controls the electronic apparatus 200 by executing a computer program stored in a memory 201a.

The power reception unit 202 complies with the power supply method of the power supply apparatus 100. The power reception unit 202 is used to wirelessly receive power from the power supply apparatus 100.

The power reception antenna 203 is an antenna for receiving the power supplied from the power supply apparatus 100. The power reception antenna 203 is also used for the first communication unit 206 to perform wireless communication using the NFC standard with the power supply apparatus 100. The power received by the electronic apparatus 200 from the power supply apparatus 100 via the power reception antenna 203 is supplied to the rectifying and smoothing circuit 205 via the matching circuit 204.

The matching circuit 204 includes a circuit for setting the resonance frequency of the power reception antenna 203. The control unit 201 can control the matching circuit 204 to set the resonance frequency of the power reception antenna 203 at the same predetermined frequency f as the resonance frequency of the power supply antenna 106.

The rectifying and smoothing circuit 205 generates direct-current power from the power received by the power reception antenna 203. The rectifying and smoothing circuit 205 supplies the generated direct-current power to the power control unit 207. If the power received by the power reception antenna 203 includes superposed data, the rectifying and smoothing circuit 205 supplies the data extracted from the power received by the power reception antenna 203 to the first communication unit 206.

The first communication unit 206 communicates with the power supply apparatus 100 based on the same communication standard as that of the first communication unit 105.

The first communication unit 206 analyzes the data supplied from the rectifying and smoothing circuit 205. The first communication unit 206 then uses the analysis result of the data to perform process for varying the load inside the first communication unit 206 to transmit response data to the power supply apparatus 100.

The power control unit 207 will be described with reference to FIG. 4.

The power control unit 207 supplies the power supplied from the rectifying and smoothing circuit 205 to the charging unit 208 and the regulator 210. The power control unit 207 limits the power supplied to the charging unit 208 and the regulator 210 according to a voltage level of the direct-current power supplied from the rectifying and smoothing circuit 205.

Figure 4:
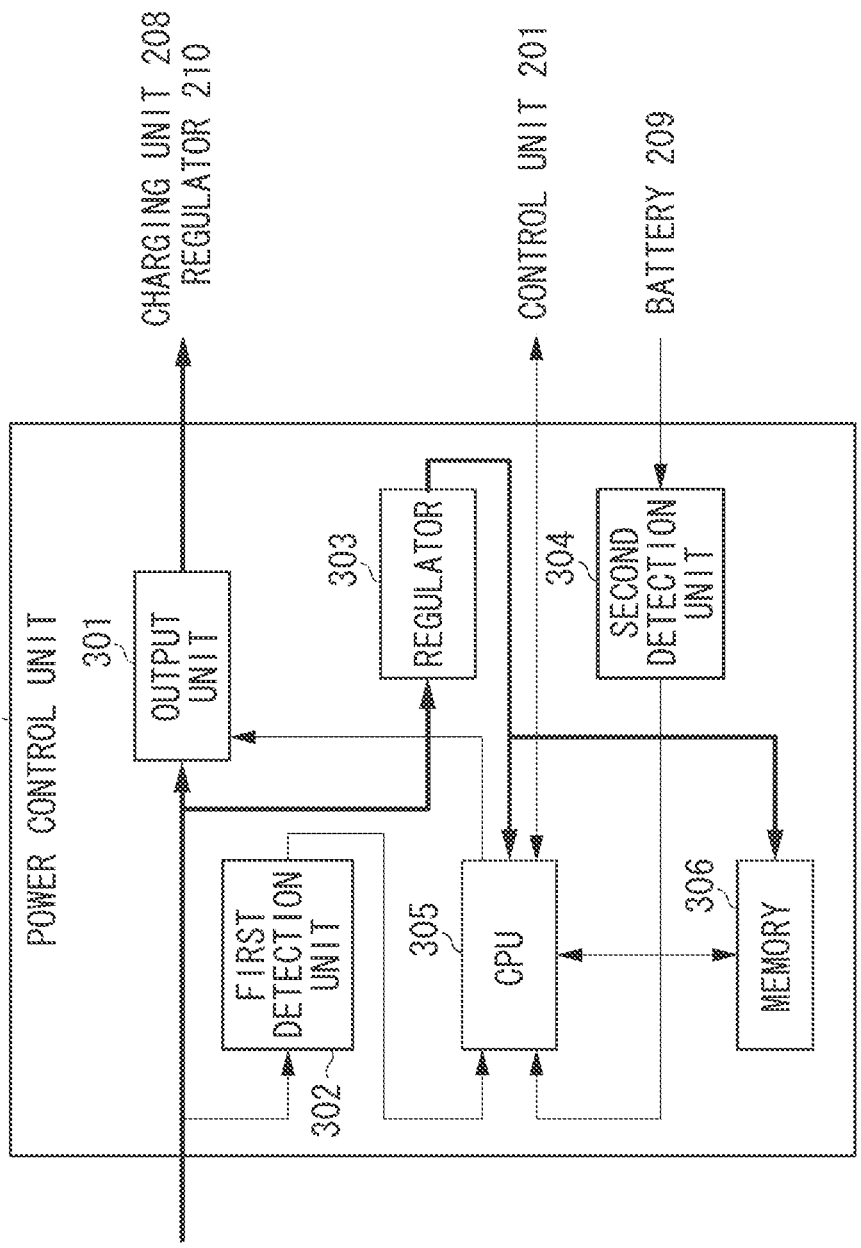
FIG. 4 is a block diagram illustrating an example of a power control unit according to the first exemplary embodiment.

As illustrated in FIG. 4, the power control unit 207 includes an output unit 301, a first detection unit 302, a regulator 303, a second detection unit 304, a CPU 305, and a memory 306.

The power control unit 207 has power consumption much lower than that of the load unit 212. For example, the load unit 212 has power consumption of 1 W or more. The power control unit 207 has power consumption of several tens of milliwatts or so.

The output unit 301 outputs the power supplied from the rectifying and smoothing circuit 205 to at least one of the charging unit 208 and the regulator 210 according to instructions from the CPU 305.

The first detection unit 302 detects a value of an input voltage of the power input from the rectifying and smoothing circuit 205. The voltage of the power input from the rectifying and smoothing circuit 205 will hereinafter be referred to as "voltage V1." The voltage V1 detected by the first detection unit 302 is notified to the CPU 305.

The regulator 303 converts the voltage V1 into an operation voltage of the CPU 305 and supplies the operation voltage to the CPU 305. Further, the regulator 303 converts the voltage of the power input from the rectifying and smoothing circuit 205 into an operation voltage of the memory 306, and supplies the operation voltage to the memory 306.

The second detection unit 304 detects a value of a voltage of the battery 209. The voltage of the battery 209 will hereinafter be referred to as "voltage V2." The voltage V2 detected by the second detection unit 304 is notified to the CPU 305.

The CPU 305 exchanges data with the control unit 201, and controls the power control unit 207 according to instructions from the control unit 201. The CPU 305 notifies the control unit 201 of the detected the voltages V1 and V2.

The memory 306 records the voltages V1 and V2.

The charging unit 208 charges the battery 209. The charging unit 208 is controlled whether to charge the battery 209 using the power supplied from the power control unit 207 or supply power discharged from the battery 209 to the regulator 210, according to instructions from the control unit 201. The charging unit 208 regularly detects a remaining capacity of the battery 209 and supplies charging data to the control unit 201. The charging data includes data indicating the remaining capacity of the battery 209 and data relating to the charging of the battery 209.

The battery 209 is a secondary battery connectable to the electronic apparatus 200.

The regulator 210 converts at least one of the voltage V1 and the voltage V2 into a desired voltage and supplies the resultant voltage to various parts of the electronic apparatus 200 according to instructions from the control unit 201.

The operation unit 211 provides a user interface for operating the electronic apparatus 200. The control unit 201 controls the electronic apparatus 200 according to an input signal input via the operation unit 211.

The load unit 212 includes an imaging unit configured to generate image data such as a still image and a moving image from an optical image of an object, a display unit configured to display image data, and a communication unit configured to transmit image data and audio data to an external apparatus.

The power supply apparatus 100 is configured to wirelessly supply power to the electronic apparatus 200. The term "wireless(ly)" may be rephrased as "noncontact" or "without contact."

The power supply antenna 106 and the power reception antenna 203 may be helical antennas, spiral antennas, or planar antennas such as a meander line antenna.

The electronic apparatus 200 may perform at least one of the operation of the load unit 212 and the charging operation of the battery 209 with the charging unit 208, using the power that the power reception antenna 203 receives from the power supply apparatus 100. However, in a case where the power received by the power reception antenna 203 from the power supply apparatus 100 decreases while at least one of the operation of the load unit 212 and the charging operation of the battery 209 with the charging unit 208 is performed, the electronic apparatus 200 may be overloaded.

If the electronic apparatus 200 is overloaded, the input voltage from the rectifying and smoothing circuit 205 decreases and even the voltage required for the power control unit 207 cannot be supplied. The power control unit 207 then fails to supply the control unit 201 with required voltage. In such a case, the control unit 201 stops operation and becomes unable to control the electronic apparatus 200, and the operation of the electronic apparatus 200 sometimes fails to be normally terminated. Thus, the operation of the electronic apparatus 200 may be terminated with an error occurring in the electronic apparatus 200.

In such a case, even if the power received by the power reception antenna 203 from the power supply apparatus 100 increases, it takes time for the state of the electronic apparatus 200 to return to a stable state.

To prevent such a situation, the electronic apparatus 200 is configured so that the control unit 201 is supplied with the required voltage even if the power received by the power reception antenna 203 decreases while at least one of the operation of the load unit 212 and the charging operation of the battery 209 is performed. For that purpose, the electronic apparatus 200 performs the following control process.

(Control Process)

Next, a control process according to the present exemplary embodiment will be described with reference to the flowchart of FIG. 5. The control process can be implemented by the control unit 201 executing the computer program stored in the memory 201a. The control unit 201 performs the control process after the power supply from the power supply apparatus 100 to the electronic apparatus 200 is started.

In step S501, the control unit 201 determines whether the voltage V1 notified from the CPU 305 is higher than or equal to a first predetermined value. For example, the first predetermined value is 10 [V]. If the voltage V1 is lower than the first predetermined value (NO in step S501), the process proceeds to step S502. If the voltage V1 is higher than or equal to the first predetermined value (YES in step S501), the process proceeds to step S506.

If the voltage V1 is higher than or equal to the first predetermined value (YES in step S501), the control unit 201 determines that the power control unit 207 is normally supplying power to the charging unit 208 and the regulator 210, and determines that the control unit 201 is supplied with the required voltage even if the operation of the load unit 212 and/or the charging operation of the battery 209 is performed. Therefore, the control unit 201 does not limit the power supply to the charging unit 208 and the load unit 212.

In step S502, the control unit 201 determines whether the voltage V1 notified from the CPU 305 is higher than or equal to a second predetermined value. For example, the second predetermined value is 3.5 [V]. If the voltage V1 is higher than or equal to the second predetermined value (YES in step S502), the process proceeds to step S507. If the voltage V1 is lower than the second predetermined value (NO in step S502), the process proceeds to step S503.

In step S503, the control unit 201 determines whether the voltage V2 notified from the CPU 305 is higher than or equal to a third predetermined value. The third predetermined value is a threshold for determining whether the battery 209 can supply power required for the operation of the control unit 201 and the load unit 212. For example, the third predetermined value is 3 to 6 [V]. If the voltage V2 is higher than or equal to the third predetermined value (YES in step S503), the control unit 201 determines that the battery 209 can supply the power required for the operation of the control unit 201 and the load unit 212. In this case, the process proceeds to step S507. If the voltage V2 is lower than the third predetermined value (NO in step S503), the control unit 201 determines that the battery 209 is not able to supply the power required for the operation of the control unit 201 and the load unit 212. In this case, the process proceeds to step S504.

In step S504, the control unit 201 controls the first communication unit 206 to transmit request data to the power supply apparatus 100. The request data is intended to request the power supply apparatus 100 to increase supply power supplied to the electronic apparatus 200. For example, if the first communication unit 105 of the power supply apparatus 100 receives the request data from the electronic apparatus 200, the control unit 101 controls the power supply unit 102 to change the level of the power output from the power supply antenna 106 to a value higher than the current value. In such a case, the process proceeds to step S505.

In step S505, the control unit 201 sets the electronic apparatus 200 to a first mode. The first mode is a mode for preventing the power from the battery 209 and the power from the rectifying and smoothing circuit 205 from being supplied to the load unit 212 and the operation unit 211 via the regulator 210. If the electronic apparatus 200 is in the first mode, neither of the power from the battery 209 and the power from the rectifying and smoothing circuit 205 is supplied to the load unit 212 and the operation unit 211. In such a case, the process proceeds to step S506. The first mode may be referred to as a "power save mode." If the electronic apparatus 200 is set to the first mode, the control unit 201 instructs the CPU 305 not to supply the power supplied from the rectifying and smoothing circuit 205 to the load unit 212 and the operation unit 211. Even if the electronic apparatus 200 is in the first mode, the CPU 305 controls the output unit 301 so that the control unit 201 is supplied with required power.

In step S506, the control unit 201 determines whether the amount of change of the voltage V1 notified from the CPU 305 is greater than or equal to a fourth predetermined value. If the amount of change of the voltage V1 is greater than or equal to the fourth predetermined value (YES in step S506), the process returns to step S501. If the amount of change of the voltage V1 is lower than the fourth predetermined value (NO in step S506), the process ends.

In step S507, the control unit 201 determines whether the voltage V2 notified from the CPU 305 is higher than or equal to a fifth predetermined value. The fifth predetermined value is a value that is higher than the third predetermined value and lower than a value of a voltage of the battery 209 at which the battery 209 is determined to be fully charged. For example, the fifth predetermined value is 3.6 to 7.2 [V]. If the voltage V2 is lower than the fifth predetermined value (NO in step S507), the control unit 201 determines that the power supply from the battery 209 to the load unit 212 will lower the remaining capacity of the battery 209 below the third predetermined value even if the power supply apparatus 100 is requested to increase the supply power. In this case, the process proceeds to step S508. If the value of the voltage V2 is higher than or equal to the fifth predetermined value (YES in step S507), the process proceeds to step S510.

In step S508, similar to the process in step S504, the control unit 201 controls the first control unit 206 to transmit the request data for requesting the power supply apparatus 100 to increase the supply power supplied to the electronic apparatus 200 to the power supply apparatus 100. In such a case, the process proceeds to step S509.

In step S509, the control unit 201 sets the electronic apparatus 200 to a second mode. The second mode is a mode for preventing the power from the battery 209 and the power from the rectifying and smoothing circuit 205 from being supplied to the load unit 212 via the regulator 210. If the electronic apparatus 200 is in the second mode, neither of the power from the battery 209 and the power from the rectifying and smoothing circuit 205 is supplied to the load unit 212. Even if the electronic apparatus 200 is in the second mode, the control unit 201 performs control so that at least one of the power from the battery 209 and the power from the rectifying and smoothing circuit 205 is supplied to the operation unit 211 via the regulator 210.

If the electronic apparatus 200 is set to the second mode, the control unit 201 instructs the CPU 305 not to supply the power supplied from the rectifying and smoothing circuit 205 to the load unit 212. Even if the electronic apparatus 200 is in the second mode, the CPU 305 controls the output unit 301 so that the control unit 201 is supplied with required power. In the second mode, the power consumption of the electronic apparatus 200 is higher than that in the first mode.

For example, after the value of the voltage V1 is determined to be higher than or equal to the second predetermined value (YES in step S502), in step S509, the control unit 201 controls the regulator 210 so that the power from the rectifying and smoothing circuit 205 is supplied to the operation unit 211 via the regulator 210. After the value of the voltage V1 is determined to be higher than or equal to the second predetermined value (YES in step S502), in step S509, the control unit 201 may further control the regulator 210 so that the power from the battery 209 is not supplied to the operation unit 211 via the regulator 210.

For example, after the value of the voltage V2 is determined to be higher than or equal to the third predetermined value (YES in step S503), in step S509, the control unit 201 controls the regulator 210 so that the power from the battery 209 is supplied to the operation unit 211 via the regulator 210. After the value of the voltage V2 is determined to be higher than or equal to the third predetermined value (YES in step S503), in step S509, the control unit 209 may further control the regulator 210 so that the power from the rectifying and smoothing circuit 205 is not supplied to the operation unit 211 via the regulator 210.

In such a case, the process proceeds to step S506.

In step S510, similar to the process performed in step S504, the control unit 201 controls the first communication unit 206 to transmit the request data for requesting the power supply apparatus 100 to increase the supply power supplied to the electronic apparatus 200, to the power supply apparatus 100. In such a case, the process proceeds to step S511.

In step S511, the control unit 201 sets the electronic apparatus 200 to a third mode. The third mode is a mode for supplying at least one of the power from the battery 209 and the power from the rectifying and smoothing circuit 205 to the operation unit 211 and the load unit 212 via the regulator 210. If the electronic apparatus 200 is in the third mode, at least one of the power from the battery 209 and the power from the rectifying and smoothing circuit 205 is supplied to the operation unit 211 and the load unit 212. Even if the electronic apparatus 200 is in the third mode, the CPU 305 controls the output unit 301 so that the control unit 201 is supplied with required power. In the third mode, the power consumption of the electronic apparatus 200 is higher than that in the second mode.

For example, if the value of the voltage V1 is higher than or equal to the second predetermined value (YES in step S502), then in step S511, the control unit 201 controls the regulator 210 so that the power from the rectifying and smoothing circuit 205 is supplied to the operation unit 211 and the load unit 212 via the regulator 210. After the value of the voltage V1 is determined to be higher than or equal to the second predetermined value (YES in step S502), in step S511, the control unit 201 may control the regulator 210 so that the power from the battery 209 is not supplied to the operation unit 211 and the load unit 212 via the regulator 210.

For example, if the value of the voltage V2 is higher than or equal to the third predetermined value (YES in step S503), then in step S511, the control unit 201 controls the regulator 210 so that the power from the battery 209 is supplied to the operation unit 211 and the load unit 212 via the regulator 210. In such a case, the process proceeds to step S506. If the value of the voltage V2 is higher than or equal to the third predetermined value (YES in step S503), then in step S511, the control unit 201 may control the regulator 210 so that the power from the rectifying and smoothing circuit 205 is not supplied to the operation unit 211 and the load unit 212 via the regulator 210.

If the value of the voltage V1 is determined to be higher than or equal to the second predetermined value (YES in step S502) and the value of the voltage V2 is higher than or equal to the third predetermined value (YES in step S503), then in step S511, the control unit 201 controls the regulator 210 so that the power from the rectifying and smoothing circuit 205 is supplied to the operation unit 211 and the load unit 212 via the regulator 210. The control unit 201 further controls the regulator 210 so that the power from the battery 209 is not supplied to the operation unit 211 and the load unit 212 via the regulator 210.

Figure 5:
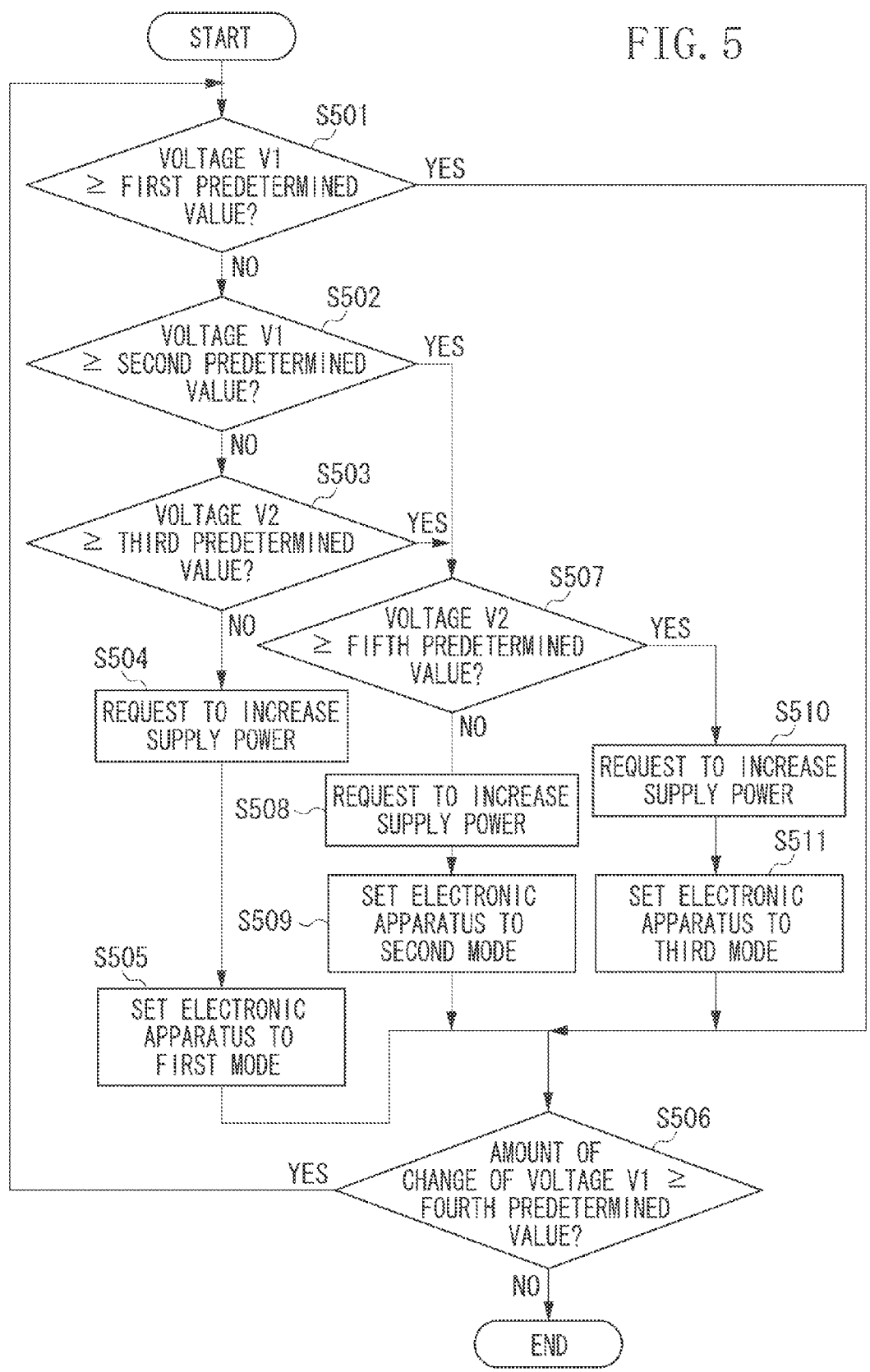
FIG. 5 is a flowchart illustrating an example of a control process according to the first exemplary embodiment.

FIG. 6 is a predetermined table 600 illustrating a relationship between the voltage V1, the voltage V2, and the modes of the electronic apparatus 200 in the above-described control process illustrated in FIG. 5. A number 601 in the predetermined table 600 of FIG. 6 indicates a voltage V1 notified to the control unit 201. A number 602 in the predetermined table 600 of FIG. 6 indicates a voltage V2 notified to the control unit 201. A number 603 in the predetermined table 600 of FIG. 6 indicates a mode of the electronic apparatus 200 set by the control unit 201 according to the voltage V1 and the voltage V2.

As described above, the electronic apparatus 200 limits the power supply inside the electronic apparatus 200 according to the voltage supplied from the power supply apparatus 100 and the voltage of the battery 209. When at least one of the operation of the load unit 212 and the charging operation of the battery 209 is performed, the electronic apparatus 200 can thus supply the control unit 201 with required power even if the power received by the power reception antenna 203 decreases.

In addition, the predetermined frequency f is not limited to 13.56 MHz. For example, the predetermined frequency f may be 6.78 MHz. The predetermined frequency f may be any one of frequencies in the range of 100 kHz to 200 kHz.

The power supply apparatus 100 outputs the second power via the power supply antenna 106, and performs communication using the first power via the power supply antenna 106. However, this is not restrictive. For example, the power supply apparatus 100 may separately include a first antenna for outputting the second power and a second antenna for performing communication using the first power. In such a case, the power supply apparatus 100 may set the resonance frequency of the first antenna at 6.78 MHz, and the resonance frequency of the second antenna at 13.56 MHz.

The electronic apparatus 200 receives power from the power supply apparatus 100 via the power reception antenna 203, and communicates with the power supply apparatus 100 via the power reception antenna 203. However, this is not restrictive. For example, the electronic apparatus 200 may separately include a third antenna for receiving power from the power supply apparatus 100 and a fourth antenna for communicating with the power supply apparatus 100. In such a case, the electronic apparatus 200 may set the resonance frequency of the third antenna at 6.78 MHz, and the resonance frequency of the fourth antenna at 13.56 MHz.

The power supply method of the power supply apparatus 100 may employ the "Qi" standard defined by the Wireless Power Consortium (WPC) or a standard defined by the Alliance for Wireless Power (A4WP). The power supply method of the power supply apparatus 100 may employ a standard defined by Broadband Wireless Forum (BWF).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-023828 filed Feb. 10, 2014, which is hereby incorporated by reference herein in its entirety.

What is claimed is:

1. A power reception apparatus comprising:
   a power reception unit configured to wirelessly receive power from a power supply apparatus;
   a first detection unit configured to detect a voltage of the power received by the power reception unit;
   a second detection unit configured to detect a voltage output from a battery;
   a load unit; and
   a control unit configured to control supply of the power received by the power reception unit to the load unit according to a detection result of the first detection unit and a detection result of the second detection unit,
   wherein, in a case where a voltage detected by the first detection unit is lower than a first predetermined value, the control unit limits supply of power which is received by the power reception unit to the load unit based on the detection result of the second detection in order to keep power for supplying to the control unit, and
   wherein, in a case where the voltage detected by the first detection unit is higher than or equal to the first predetermined value, the control unit does not limit supply of power which is received by the power reception unit to the load unit regardless of the detection result of the second detection unit.

2. The power reception apparatus according to claim 1, wherein the control unit is configured to, in a case where a voltage detected by the first detection unit is lower than the first predetermined value and a voltage detected by the second detection unit is lower than a third predetermined value, limit a-supply of power received by the reception unit to the load unit.

3. The power reception apparatus according to claim 1, wherein the control unit is configured to, in a case where a voltage detected by the first detection unit is lower than a second predetermined value and a voltage detected by the second detection unit is lower than a fifth predetermined value and higher than or equal to a third predetermined value, limit supply of power received by the power reception unit to the load unit, and
   wherein the second predetermined value is lower than the first predetermined value.

4. The power reception apparatus according to claim 1, wherein the control unit is configured to, in a case where a voltage detected by the first detection unit is lower than a second predetermined value and a voltage detected by the second detection unit is higher than or equal to a fifth predetermined value, limit-a supply of power received by the power reception unit to the load unit, and
   wherein the second predetermined value is lower than the first predetermined value, and the fifth predetermined value is higher than a third predetermined value.

5. The power reception apparatus according to claim 4, wherein the control unit is configured to, in a case where a voltage detected by the first detection unit is lower than the second predetermined value and a voltage detected by the second detection unit is higher than or equal to the fifth predetermined value, perform control to supply power received from the battery to the load unit.

6. The power reception apparatus according to claim 1, wherein the control unit is configured to, in a case where a voltage detected by the first detection unit is lower than the first predetermined value and higher than or equal to a second predetermined value and a voltage detected by the second detection unit is lower than a fifth predetermined value, limit supply of power received by the power reception unit to the load unit, and
   wherein the fifth predetermined value is higher than a third predetermined value.

7. The power reception apparatus according to claim 6, wherein the control unit is configured to, in a case where a voltage detected by the first detection unit is lower than the first predetermined value and higher than or equal to the second predetermined value and a voltage detected by the second detection unit is lower than the fifth predetermined value, limit supply of power received from the battery to the load unit.

8. The power reception apparatus according to claim 1, wherein the control unit is configured to, in a case where a change of a voltage detected by the first detection unit is higher than or equal to a third predetermined value, control-a supply of power received by the power reception unit to the load unit again according to the detection result of the first detection unit and the detection result of the second detection unit.

9. The power reception apparatus according to claim 1, wherein the load unit is configured to include at least one of a display unit, an imaging unit, and a communication unit.

10. A method for controlling an electronic apparatus having a control unit, comprising:
   wirelessly receiving, at a power reception unit, power from a power supply apparatus;
   detecting a voltage of the power received from the power supply apparatus;
   detecting a voltage output from a battery;

controlling, by the control unit, supply of the power received from the power supply apparatus to a load unit according to a detection result of the value of the voltage of the power received from the power supply apparatus and a detection result of the value of the voltage output from the battery, wherein in a case where the voltage of the power received from the power supply apparatus is lower than a first predetermined value, limiting supply of power which is received by a power reception unit to the load unit based on the voltage output from the battery in order to keep power for supplying to the control unit, and in a case where the voltage of the detected power received from the power supply apparatus is higher than or equal to the first predetermined value, not limiting supply of power which is received by the power reception unit to a load unit regardless of the detected voltage output from the battery.

11. A storage medium storing a computer-executable program, the program, when executed, causing a computer to perform a process for controlling an electronic apparatus having a control unit, the process comprising:

wirelessly receiving, at a power reception unit, power from a power supply apparatus;

detecting a voltage of the power received from the power supply apparatus;

detecting a voltage output from a battery;

controlling, by the control unit, supply of the power received from the power supply apparatus to a load unit according to a detection result of the value of the voltage of the power received from the power supply apparatus and a detection result of the value of the voltage output from the battery, wherein in a case where the voltage of the power received from the power supply apparatus is lower than a first predetermined value, limiting supply of power which is received by a power reception unit to the load unit based on the voltage output from the battery in order to keep power for supplying to the control unit; and in a case where the detected voltage of the power received from the power supply apparatus is higher than or equal to the first predetermined value, not limiting supply of power which is received by the power reception unit to a load unit regardless of the detected voltage output from the battery.

* * * * *